Nov. 15, 1966   E. L. ELKINS   3,285,118
ANCHOR BOLT WITH SPRING ACTUATED TOGGLE HEAD
Filed Jan. 8, 1965

INVENTOR:
Edward L. Elkins
BY Bedell and Burgess
ATTORNEYS.

United States Patent Office 3,285,118
Patented Nov. 15, 1966

3,285,118
ANCHOR BOLT WITH SPRING ACTUATED
TOGGLE HEAD
Edward L. Elkins, East St. Louis, Ill.
(9 Kingston Drive, Caseyville, Ill.)
Filed Jan. 8, 1965, Ser. No. 424,295
2 Claims. (Cl. 85—3)

The invention relates to anchors of the type in which an elongated unit is inserted lengthwise into or through a wall, a panel, or similar structure, and is provided with clamping elements to grip opposite faces of the structure.

Among the objects of the invention are to effect a positive clamp which is particularly desirable where heavy loads are to be supported; to adapt a given size of anchor for application to substantially different thicknesses of wall or other mounting structure; and to make possible the ready removal and reuse of the anchor without leaving any part in the first installation and without injury to the mounting structure.

These and other detail objects of the invention are attained by the structure illustrated in the accompanying drawings, in which.

Figure 1:
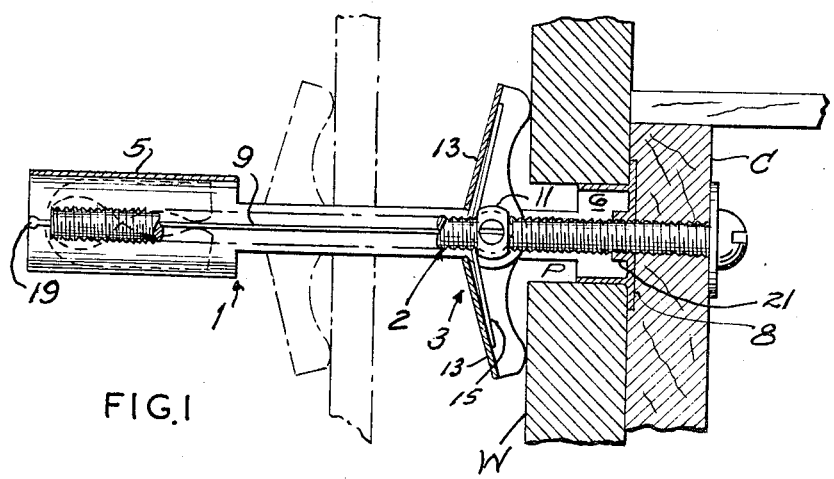
FIG. 1 is a longitudinal section through the anchor mounted on a wall or panel and also showing in section an article supported by the anchor. Broken lines indicate the range of the anchor.

The main parts of the anchor are a body member 1, a long shank bolt member 2 and a locking unit 3. The body member comprises an inner tubular portion 5, an outer tubular or collar portion 6, and narrow elongated strips 7 extending between end portions 5 and 6 and spaced from each other circumferentially to provide elongated slots between the strips. Outer portion 6 has a transversely projecting flange 8. Extending substantially the full length of the body member are guide elements 9 projecting inwardly from the sides of the body member.

Bolt member 2 is threaded substantially throughout its length to engage the threads of a nut 11 which has laterally projecting integral pins 12 slotted to slidably mount the nut on guide elements 9. Locking wings 13 are pivotally mounted on pins 12 and may swing to the full line position shown in FIGS. 1 and 2, or to the broken line position shown at the left hand end of FIG. 1. A butterfly wire spring 15 coiled around one of pins 12 has arms bearing against the outer portion of the wings and thrusting them to the extended position in which they project through the slots in the sides of the housing.

If bolt 2 is turned to move the nut toward the end of the bolt remote from its head and the bolt fully telescoped with the body member, the nut will move into the inner tubular portion 5 of the body and the wings will move into position substantially parallel to the bolt shank. Stops 19 on the inner ends of guides 9 prevent the nut not being pushed off of the guides. When in this position the entire clamp unit may be inserted through an opening P in wall W until flange 8 is seated against the outer face of the wall. The bolt may then be pulled to the right to withdraw wings 13 from inner tubular portion 5 and the bolt may be rotated to feed the locking unit against the wall as shown in full lines in FIG. 1 and a cabinet C or other structure may be clamped to the wall.

To remove the assembly from the wall all that is required is to unscrew the bolt and thereby to feed nut 11 to the left until wings 13 are collapsed within inner tubular portion 5 whereupon the wings will be held in collapsed position parallel to the axis of the bolt and the assembly may be removed bodily through opening P by prying flange 8 away from the wall and then pulling the assembly to the right.

Figure 2:
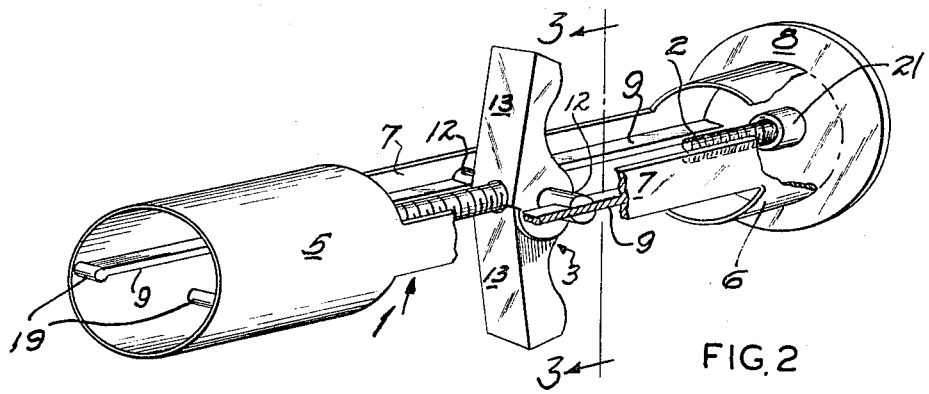
FIG. 2 is a perspective of the anchor drawn to a larger scale.
Figure 3:
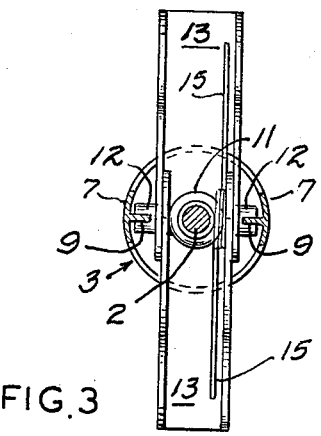
FIG. 3 is a transverse section on line 3—3 of FIG. 2.

The bolt may be withdrawn completely from the assembled body 1 and clamping unit 3 when the latter are in the position shown in FIG. 1 to more readily apply the bolt to a structure to be mounted upon the wall. If this is done and cabinet C, for example, applied to the wall and the bolt inserted through the cabinet into collar 6, a short sleeve 21 on flange 8, snugly surrounding the bolt shank, will guide the latter coaxially with the body so that the inner end of the bolt will be aligned with the hole through the nut and no difficulty will be encountered in threading the bolt into the nut irrespective of the distance between the nut and collar flange 8. The features just described allow the bolt to be removed separately from, or with, the housing member without losing the nut.

The clamp may be adjusted to engage the inner face of a double wall, as indicated in dot-dash lines in FIG. 1. In such an installation the total thickness of the wall may be several times that of the single wall shown in full lines. This does not affect the efficiency of the device or the advantageous features previously referred to. No special tools are required either for installing the clamp or for removing it from a wall.

The details of the structure may be varied substantially without departing from the spirit of the invention and the exclusive use of those modifications coming within the scope of the claims is contemplated.

What is claimed is:

1. A wall clamping anchor comprising an elongated tube-like body with similarly elongated slots in its side,
 a wall-engaging flange at one end of the body and of larger diameter than the remainder of the body,
 similarly elongated guides projecting inwardly from the side of the body intermediate said slots, substantially throughout the length of the latter,
 a threaded nut having radially projecting cylindrical trunnions with transverse slots receiving said guides and held thereby against rotation in said body,
 a pair of diametrically opposite locking wings each pivoted at their inner ends on said nut to swing to positions parallel to and normal to the axis of said nut by projecting through said slots,
 there being radially projecting stops at the ends of the guides remote from said rim,
 spring means anchored on said nut and engaging said wings to urge them to said normal positions,
 and an elongated headed bolt threaded into said nut and long enough to extend into the inner end of the body, said nut being adjustable along the bolt to the inner end of the bolt by rotation of said bolt in one direction and being movable along the body by axial shifting of the bolt toward the inner end of the body to thereby move the inner ends of said wings into said annular portion of the body and thereby swing said wings on their pivots into positions parallel to said shank.

2. An anchor bolt comprising an elongated tube-like body having a sleeve-like inner end and a substantially closed outer end with a central aperture of relatively small diameter and with a radially projecting flange, said body having elongated slots in its sides terminating a substantial distance from each of said ends, said body having a pair of elongated narrow guides projecting inwardly from its opposite sides and paralleling said slots,
 a nut having a threaded opening and having lateral projections slidably engaging said guides and holding the nut against rotation in said body and against tilting of the axis of said opening relative to the axis of said body, a pair of elongated locking wings each pivoted at one end to said nut and movable on its pivot to a position parallel to and inwardly of the side of said body and to a position projecting from the body transversely of the body axis through said slots, and a bolt with an elongated threaded shank slidable through said body apertured outer end and threadably engageable with said nut and removable from said body and nut through said body outer end when rotated in one direction, said bolt having a head with a shoulder disposed to abut said body outer end to draw said nut and wings toward said head and clamp the wings against a wall or the like between them and said head.

References Cited by the Examiner
UNITED STATES PATENTS 2,024,871  12/1935  Parsons.
2,609,723  9/1952   Stubbs.

FOREIGN PATENTS 130,259  11/1948  Australia.
589,084  6/1947   Great Britain.
38,137   2/1913   Sweden.

CARL W. TOMLIN, *Primary Examiner.*

EDWARD C. ALLEN, *Examiner.*

R. S. BRITTS, *Assistant Examiner.*